W. EVENSEN

Sept. 23, 1930. FOLDING MECHANISM Re. 17,814

Original Filed Dec. 29, 1924 3 Sheets-Sheet 1

W. Evensen INVENTOR

BY John D. Morgan ATTORNEY

Sept. 23, 1930.
W. EVENSEN
FOLDING MECHANISM
Re. 17,814
Original Filed Dec. 29, 1924 3 Sheets-Sheet 2
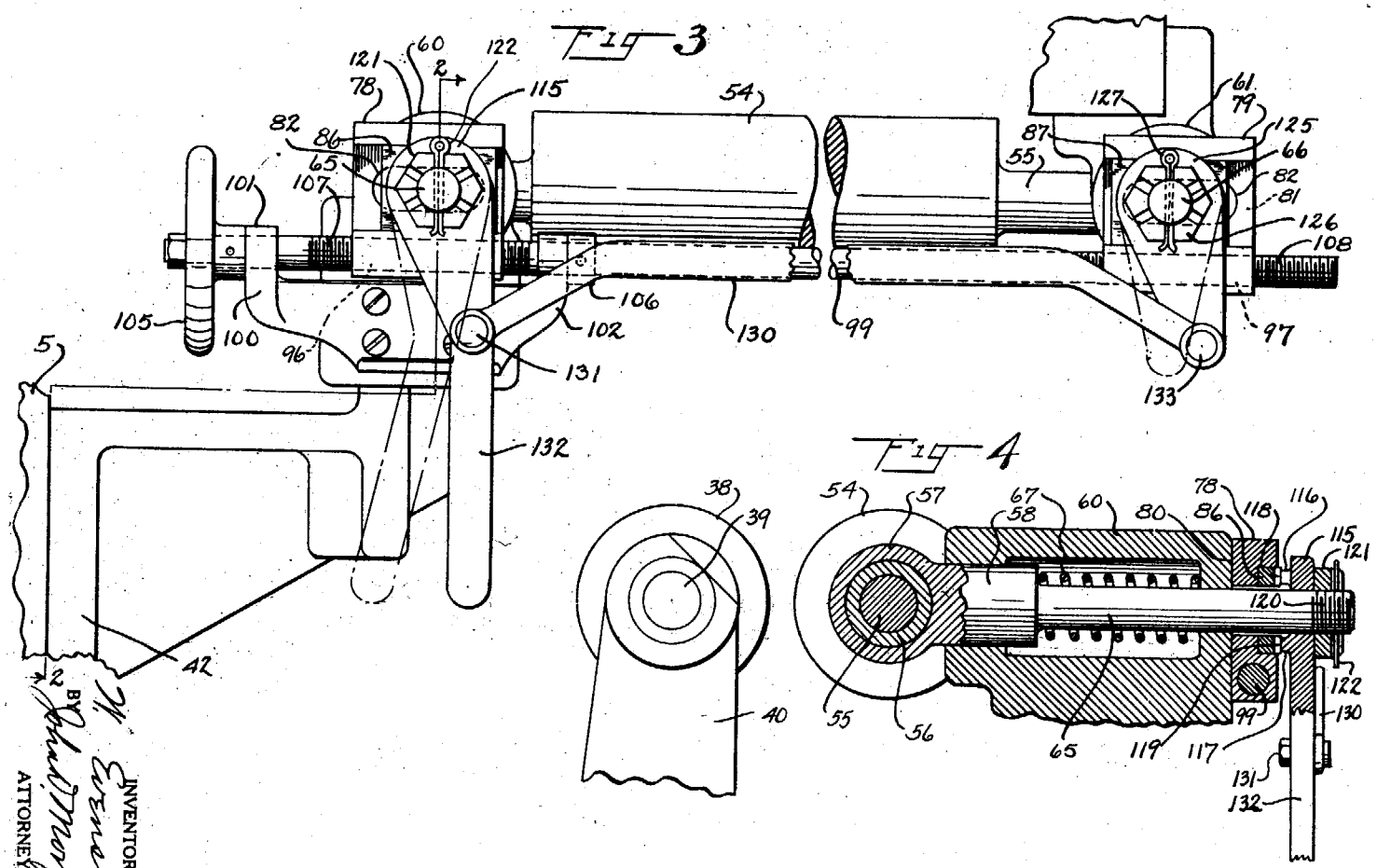
INVENTOR
W. Evensen
BY John D. Morgan
ATTORNEY

W. EVENSEN

FOLDING MECHANISM

Sept. 23, 1930. Re. 17,814

Original Filed Dec. 29, 1924 3 Sheets-Sheet 3

W. Evensen INVENTOR

BY John D Morgan

ATTORNEY

Reissued Sept. 23, 1930 Re. 17,814

UNITED STATES PATENT OFFICE

WILLIAM EVENSEN, OF CHICAGO, ILLINOIS, ASSIGNOR TO GOSS PRINTING PRESS COMPANY, A CORPORATION OF ILLINOIS

FOLDING MECHANISM

Original No. 1,701,177, dated February 5, 1929, Serial No. 758,553, filed December 29, 1924. Application for reissue filed October 29, 1929. Serial No. 403,337.

The invention relates to a novel folding mechanism, and in certain of its aspects, more especially to rotary folding mechanism for imparting the transverse fold to newspapers preparatory to delivery.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 3 is a fragmentary detail elevation looking at Fig. 2 (and the lower corresponding part of Fig. 1) from the right;

Fig. 4 is a fragmentary detail, corresponding to the upper part of Fig. 2, but showing one of the folding rollers retracted from folding position to permit the removal of a choked fold;

Figure 1:
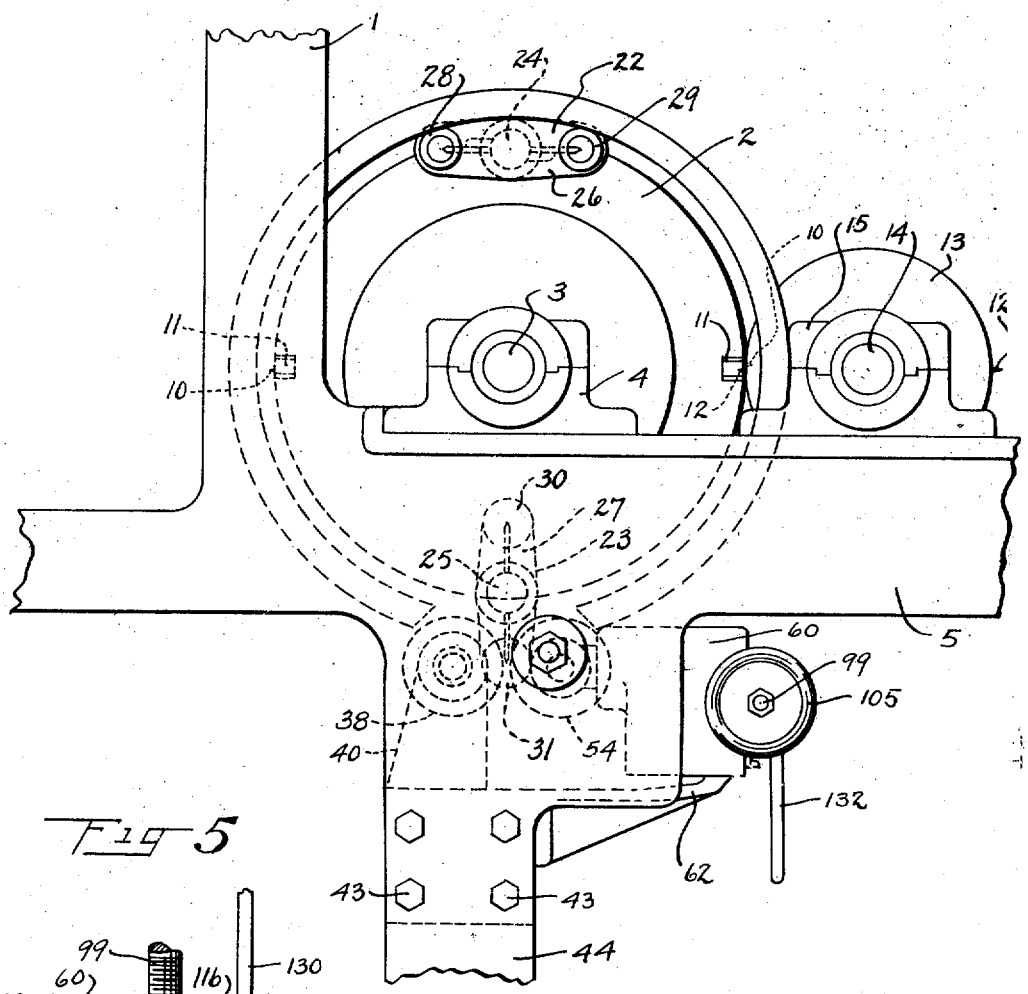
Fig. 1 is a fragmentary side elevation of the folding mechanism of a rotary printing press embodying the invention.

The invention is directed primarily to a mechanism for quickly and instantaneously retracting a folding roller to permit easy and immediate removal from the folding roller of a choked paper, and then quickly and easily restoring the roller to its folding position with respect to its cooperating roller. It sometimes happens, especially in rapid newspaper folding, wherein heavy newspapers are given the final transverse fold at the rate of thirty-five thousand to forty thousand folds per hour, that a paper will become jammed or choked in the folding rollers, and it is exceedingly desirable to be able to immediately and with very little trouble clean out a chocked or jammed paper and have the folding roller returned easily, immediately and accurately to folding position.

The invention is directed further to providing functions and capacities as just described in connection with mechanism for variably and accurately positioning one or both folding rollers to regulate the width of opening between them. Such variable positioning is necessary in presses wherein the number of pages in successive issues varies very widely, the range of variance frequently being, for example, between eight pages and thirty-six pages or more for different issues or days, and for effective folding it is necessary that the space between the two cooperating folding rollers be correspondingly varied and regulated.

The invention, as embodied, is also applied to a folding mechanism embodying the foregoing described features and constructions and wherein one or both folding rollers have a resilient action when in folding position and during the folding operation.

The invention is shown applied to a fast rotary transverse newspaper folder, and the invention finds one of its greatest fields of usefulness in such machines, although it will be understood that it is applicable to, and useful with, other kinds of folding mechanisms.

Referring now in detail to the embodiment of the invention illustrated by way of example in the accompanying drawings, the general frame of a printing press is indicated by 1, and a folding cylinder by 2. The cylinder may be of any usual or known form, and has its shaft 3 mounted in bearings 4 carried upon the cross reaches 5 of the folder side frames of press.

The cooperating mechanism for cutting the web and engaging and carrying the new web end is shown only partially and in a general way, and may be of standard or other convenient form. The successive head ends of the webs are held by either of two sets of semicircumferentially separated impaling pins 11, the pins being forced through the lead end of the plicated webs when the transverse cut is made in the usual manner. The transverse series of impaling pins are mounted in the corresponding cutting blocks 11, with which cooperate the cutting blades 12. The blades 12 are mounted on the cylinder 13, the shaft 14 of which is journaled in bearings 15 carried on the reaches 5 of the side frame of the folder.

Mounted on the folding cylinder 2 are two tucking blade mechanisms 22 and 23, respectively, located a semicircumference apart, these blades being preferably of the usual double type. The shafts of the blades 24 and 25, respectively, are journaled in the cylinder 2, and fixed centrally to these respective shafts are corresponding actuating arms 26 and 27. The arm 26 has at either end thereof cam rollers 28 and 29, and the arm 27 has at the ends thereof corresponding cam rollers 30 and 31. These cooperate with suitable actuating mechanisms (not shown), which may be of any standard or suitable form, such as the well known Husby cam mechanism. All the foregoing mechanism is old and well known and may be of any standard form or any other suitable form, as may be desired.

Referring now in detail to the folding rollers between which the newspapers, or other group of sheets, is tucked by the folding blades 22 or 23 (Figs. 1, 2 and 4), one of the cooperating folding rollers 38 is preferably mounted in fixed position with respect to the folding locus, although both rollers may be movable relatively thereto if desired. The shaft 39 of roller 38 is mounted in bearings carried upon pillars 40, at either end thereof. The two pillars 40 are integral with and extend upwardly from corresponding brackets 41, which have at their lower ends plates 42, which plates face against the inner surfaces of the reaches 44 of the folder side frames, and are bolted thereto by bolts 43.

The cooperating folding roller 54 is variably positionable to regulate the width of the folding space between the cylinders for folding papers having widely varying numbers of sheets. This roller also is quickly and easily retractable to permit the removal of a choked product; is quickly and easily returnable to exact folding position; and is also resiliently mounted to yield during the folding action, there being also means for regulating the amount or degree of this resilient yielding action.

This folding roller (Figs. 1, 2 and 4) 54 has its shaft 55 mounted at either end in friction sleeves 56, carried in bearings 57. The respective bearings 57 have rearwardly extending cylindrical parts 58 mounted, respectively, for longitudinal movement in hollow cylindrical housings 60 and 61, the hubs 58 being supported free for longitudinal movement in the forward or inner end of the corresponding housings 60 and 61.

The housings 60 and 61, respectively, are mounted in fixed position upon brackets 62, integral with and extending inwardly and rearwardly from the corresponding supporting plates 42, already described.

From the cylindrical supporting parts 58 for the bearings of roller 54 there extends rearwardly cylindrical, integral rods 65 and 66, which are supported, free for longitudinal movement in the rear ends of the corresponding housings 60 and 61. Rods 65 and 66 project rearwardly from their housings 60 and 61 for engagement and cooperation with the means for positioning the folding roller 54 for folding and with the means for retracting roller 54 to remove the choked product and thereafter restoring it to folding position.

The embodiment means for imparting the resilient folding action to the folding roller 54 comprises helical springs 67 coiled about rods 65 and 66, respectively, and in compression between the ends of the parts 58 of the folding roller support and the inner faces of the rear ends of the housing 60 and 61.

Referring primarily to the means for variably and regulably positioning folding roller 54 to change the space between the folding rollers for folding products of different thicknesses, this mechanism is an improvement on the corresponding mechanism shown in my copending application Ser. No. 625,579 filed March 16, 1923. In the present embodied form, two wedge mechanisms are provided, cooperating with the stems or rods 65 and 66, already described. In these respective wedge mechanisms, wedge members 78 and 79 have, respectively, straight faces 80 and 81, bearing against the exterior surfaces of the rear ends of the corresponding housings 60 and 61. The corresponding rods or stems 65 or 66 extend through oblong apertures 82 in the corresponding wedge members 78 and 79 so that the wedge member may have transverse movement relatively to its rod.

The respective wedge members 78 and 79 are centrally recessed on their rear sides to receive and support, respectively, cooperating wedge members 86 and 87. The wedge members 86 and 87 are each cylindrically centrally apertured at 88, the corresponding rods 65 or 66 passing therethrough, and by reason of the shape of the aperture, the wedge members 86 and 87 are held in fixed transverse position with respect to the rods 65 and 66. The inclined surfaces 90 of the wedge members 86 and 87 contact with and cooperate with the corresponding inclined surfaces 91 of the wedge members 78 and 79, as the latter move transversely with respect to the rods 65 and 66, thus increasing and decreasing the thickness of the wedges, and thereby moving roller 54 toward and away from roller 38.

Means are provided for simultaneously imparting this transverse movement to the wedge members 78 and 79, and as embodied, these wedge members are each provided near the bottom part thereof with internally screw-threaded apertures 96 and 97. A screw-shaft 99 is journaled in a bifurcated bracket 100, bolted onto the lower rear portion of the housing 60. This bracket is branched and extends upwardly at either side of the left-hand wedge mechanism in Fig. 3 to provide two bearings 101 and 102 for the shaft 99.

In the embodied actuating means for the screw shaft, on the external side of the bearing 101 is fixed a hand-wheel 105 by means of which the screw shaft 99 is rotated. The hub of the hand wheel abuts on the outside of bearing 101, and a collar 106 is fixed to the shaft 99 on the opposite side of the bearing 102, and the shaft is thus free to rotate but is held against longitudinal movement. The shaft has a screw-threaded portion 107 within the wedge member 78, and a like screw-threaded portion 108 within the wedge member 79.

Thus by rotating the screw shaft the corresponding wedge members 78 and 79 are moved longitudinally of the screw shaft 99, and the wedge members 90 and 91 are thereby moved rearwardly or forwardly, and in cooperation with the springs 67 and the nuts 121 and 126 (later to be described) they accurately position the folding roller 54.

Referring now to the embodied form of mechanism for retracting folding roller 54 to facilitate the removal of a choked product, and for thereafter restoring it accurately to folding position, similar devices are provided for both bearings of roller 54. As embodied, on the left-hand end of Fig. 3, an arm 115 is centrally apertured and is rotatively carried upon rod 65 at the rear of the positioning mechanism just described. Means are provided whereby rotative movement imparted to the member 115 will impart considerable retraction to the bearing for the roller 54. As embodied, a pair of semi-circumferentially separated teeth 116 and 117 are formed on the inner face of the plate 115 and act as cams to cooperate with corresponding cam notches 118 and 119, formed on the rear or outer surface of the wedge member 86. The outer end of the rod 65 is provided with a screw-thread 120, a nut 121 being screwed thereonto and held in position by a linch pin 122. This nut cooperates with the mechanism just described and also with the normal positioning means and the tension determining means.

In the corresponding mechanism is provided at the other end of the folding roller, a plate 125 having corresponding cam-teeth 116 and 117 on the inner surface thereof cooperating with cam notches 118 and 119 formed in the outer face of the wedge member 87. A nut 126 is screw-threaded on the end of the rod 66 and is held in place by a linch pin 127. This mechanism is the same, and operates in the same manner as that already described.

Means are provided for simultaneously actuating the camming plates 115 and 125, and as embodied a link 130 has one end thereof pivoted at 131 to plate 115, and plate 115 is extended to provide an actuating lever or handle 132. Link 130 has its other end pivoted at 133 to the plate 125, whereby the two camming plates move together.

In the embodied means for regulably varying the space between the folding rollers, the structures and mechanisms already described are preferably utilized. By rotating the nuts 121 and 126 in either direction, and through cooperation thereof with springs 67, roller 54 may be moved toward or from folding roller 38, in nice and accurate relation.

Figure 5:
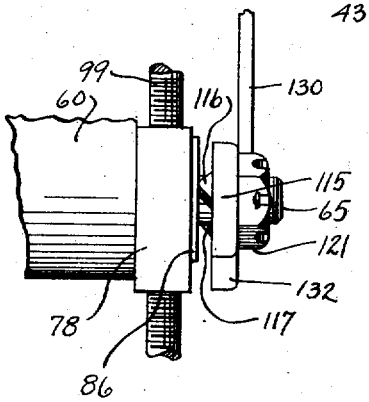
Fig. 5 is a fragmentary top plan corresponding to the right-hand end of Fig. 3 with the parts in the position of Fig. 4.
Figure 2:
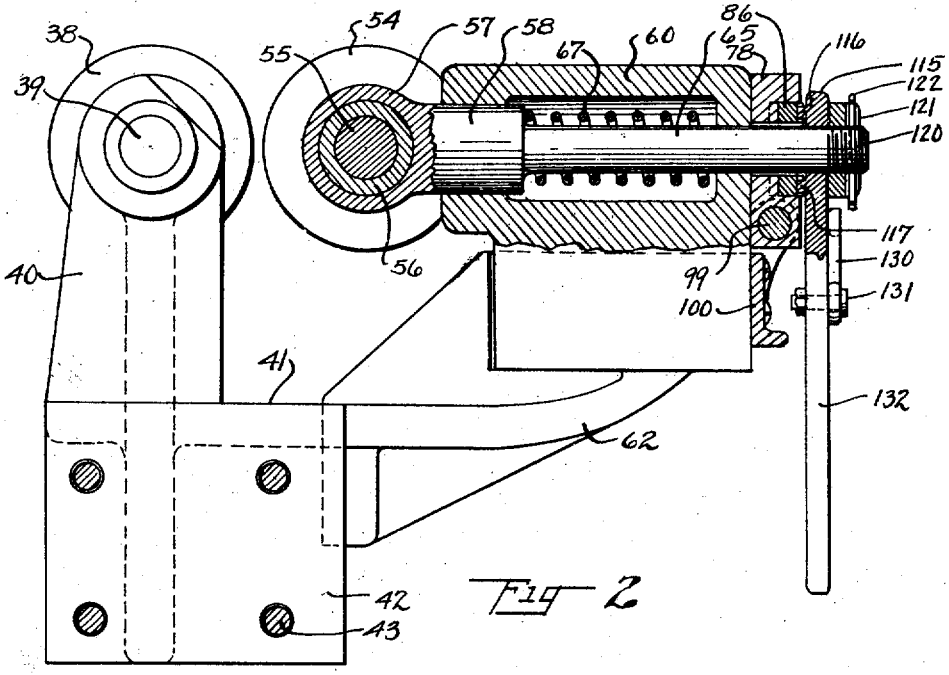
Fig. 2 is an enlarged, fragmentary detail in elevation, with parts in section, of the folding roller mechanism shown at the lower part of Fig. 2, the rollers being in folding position.
Figure 8:
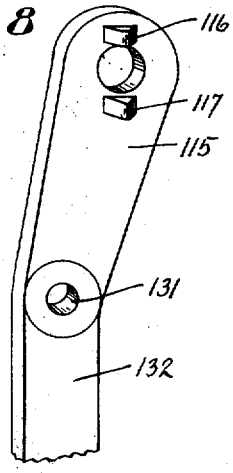
Figs. 6, 7 and 8 are perspective detached details of the roller-positioning wedges and the actuating lever for retracting the folding roller from folding position.
Figure 7:
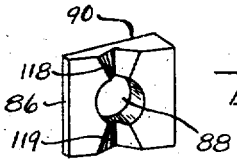
Figure 6:
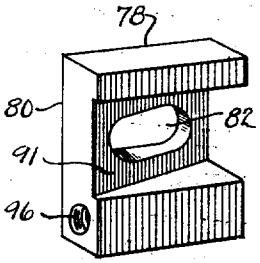

In cleaning a choked fold, lever 132 is moved from full line to broken line position in Fig. 3, and thus plates 115 and 125 are rotated on their respective rods 65 and 66, and their cam teeth 116 and 117 are moved out of the corresponding pairs of cam notches 118 and 119 (that is from the position of Figs. 2 and 3 to that of Figs. 4 and 5) and the folding roller 54 is retracted as shown in Fig. 4. Thus any newspaper or other product which had been choked into the folding space between the folding rollers as shown in Fig. 2 would be easily removable from the relatively wide space between the folding rollers, as shown in Fig. 4. After the choked product is removed, the hand lever 132 is moved back from the broken line to the full line position of Fig. 3, and cam teeth 116 and 117 again pass into the cam notches 118 and 119, under impulsion of the springs 67 and 68. Folding roller 54 is thereby immediately restored to the folding position as determined and regulated by the nuts 121 and 126 in cooperation with the springs 67 as already described.

From all the foregoing it will be understood that a mechanism has been provided constituting an exemplary embodiment of the invention, and realizing the objects and advantages herein set forth, together with other objects and advantages. It will be understood further that departures may be made from the exact mechanism as shown and described, within the scope of the accompanying claims, without departing from the principles of the invention and without sacrificing its chief advantages.

What I claim is:—

1. A folding mechanism including, in combination, a pair of parallel folding rollers, a regulating means operating on both ends of a roller to regulate the space between the rollers to fold papers of various thicknesses, said means during its operation maintaining said rollers in parallelism, and additional, quick release means operated by a single movement for temporarily more widely separating the rollers to release a choked fold.

2. A folding mechanism including in combination a pair of parallel folding rollers, means for varying the space between the rollers to fold papers of various thicknesses while maintaining said rollers in parallelism, means for tucking sheets into the bite of the rollers, and manually operable cam means for quickly and temporarily separating the rollers to release a choked fold.

3. A folding mechanism including in combination a pair of folding rollers, means for varying the space therebetween, means for permitting resilient movement of a folding roller during folding, means for tucking sheets into the bite of the rollers, and manually operable means movable to one position for quickly and temporarily separating the rollers to release a choked fold, and returnable by a single movement to its initial position to restore said rollers to their previously set folding position.

4. A folding mechanism including, in combination, a pair of folding rollers, means for folding sheets into the bite of the rollers, means cooperating with both ends of one of said rollers for moving the supports thereof to vary the space between the rollers for folding papers of different thicknesses, and additional means for quickly and temporarily moving said supports to release a choked fold.

5. A folding mechanism including, in combination, a pair of parallel folding rollers, regulating means for minutely regulating the space between the rollers to fold papers of various thicknesses while maintaining said rollers in parallelism, and additional means for temporarily more widely separating said rollers to permit removal of a choke and thereafter permitting said rollers to return to folding position as determined by said regulating means.

6. A folding mechanism including, in combination, a pair of parallel folding rollers, resilient means acting on one of said rollers, screw-threaded cooperating means for regulating the space between said rollers to fold paper of different thicknesses, and cam-equipped means for camming a folding roller back from folding position to release a choke.

7. A folding mechanism including, in combination, a pair of parallel folding rollers, resilient means acting on one of said rollers, screw-threaded cooperating means for regulating the space between said rollers to fold papers of different thicknesses, and cam-equipped means for camming both ends of a folding roller back from folding position to release a choke.

8. A folding mechanism including, in combination, a pair of parallel folding rollers, screw-threaded means for regulating the space between said rollers to fold papers of various thicknesses while maintaining said rollers in parallelism, spring and cam means operated by a single movement for temporarily more widely separating the rollers to permit removal of a choked fold.

9. A folding mechanism including, in combination, a pair of folding rollers, means for tucking sheets into the bite of the rollers, moving supports at either end of one roller, a pair of contacting wedges for each support, and means for simultaneously effecting relative movement between the wedges of each pair to regulate the space between the folding rollers, and means for quickly and temporarily moving the roller and supports against the action of the springs to release a choked fold.

10. A folding mechanism including, in combination, a pair of folding rollers, means for tucking sheets into the bite of the rollers, moving supports at either end of one roller, a pair of contacting wedges for each support, means for simultaneously effecting relative movement between the wedges of each pair to regulate the space between the folding rollers, and manually operated means for quickly and temporarily moving the roller and supports against the action of the springs to release a choked fold.

11. A folding mechanism for a high speed rotary printing press including, in combination, a pair of parallel folding rollers, means to obtain minute variations of the folding gap between said parallel rollers, and means operable by a single movement to suddenly increase the separation of said rollers by a definite amount to release a choked fold.

12. A folding mechanism for a high speed rotary printing press including, in combination, a pair of parallel folding rollers, means to obtain minute variations of the folding gap between said parallel rollers, and means to suddenly fix said rollers in non-folding position by increasing their separation.

13. A folding mechanism for a high speed rotary printing press including, in combination, a pair of parallel folding rollers, means to obtain minute variations of the folding gap between said parallel rollers, and means to instantaneously effect a further, fixed separation between said rollers.

14. A folding mechanism for a high speed rotary printing press including, in combination, a pair of parallel folding rollers, means to obtain minute variations of the folding gap between said parallel rollers, and means to instantaneously lock said rollers in widely separated relation.

15. A folding mechanism for a high speed rotary printing press including, in combination, a pair of parallel folding rollers, means to obtain minute variations of the folding gap between said parallel rollers, and means to instantaneously effect a further, fixed separation between said rollers, without distributing the setting of said first-mentioned means.

16. A folding mechanism for a high speed rotary printing press including, in combination, a pair of parallel folding rollers, means to obtain minute variations of the folding gap between said parallel rollers, and self-locking means to instantaneously further separate said rollers.

17. A folding mechanism for a high speed rotary printing press including in combination, a pair of parallel folding rollers, means to obtain minute variations of the folding gap between said parallel rollers, and a single means to instantaneously move and lock one of said rollers at a comparatively great distance from the other.

18. A folding mechanism for a high speed rotary printing press including in combination, a pair of parallel folding rollers, means to obtain minute variations of the folding gap between said parallel rollers, and single means to instantaneously lock said rollers in widely separated relation and to instantaneously restore said rollers to folding position.

19. A folding mechanism for a high speed rotary printing press including in combination, a pair of parallel folding rollers, means to obtain minute variations of the folding gap between said parallel rollers, and single means to instantaneously move and lock one of said rollers at a substantially greater distance from the other and to instantaneously unlock and return said roller to the position determined by said first-mentioned means.

20. A folding mechanism for a high speed rotary printing press including in combination a pair of parallel folding rollers, means for minutely varying the folding gap between the rollers, and quick release means for suddenly increasing said gap to non-folding proportions to release a choked fold without disturbing the setting of the gap-varying means.

21. A folding mechanism for a high speed rotary printing press including, in combination, a pair of parallel folding rollers, means for minutely varying the folding gap between the rollers, and quick release means for suddenly increasing said gap to non-folding proportions to release a choked fold without disturbing the setting of the gap-varying means and without disturbing the parallel relation of the rollers.

22. A folding mechanism for a high speed rotary printing press including, in combination, a pair of parallel folding rollers, means for minutely varying the folding gap between the rollers and means operable by a single movement to increase the folding gap to non-folding proportions to release a choked fold.

23. A folding mechanism for a high speed rotary printing press including, in combination, a pair of parallel folding rollers, means for minutely varying the folding gap between the rollers and means operable by a single movement to increase the folding gap to non-folding proportions to release a choked fold without disturbing the setting of the gap-varying means.

24. A folding mechanism for a high speed rotary printing press including, in combination, a pair of parallel folding rollers, means for minutely varying the folding gap between the rollers, and quick release means for suddenly increasing said gap to non-folding proportions to release a choked fold without disturbing the setting of the gap-varying means, said means being operable to return the rollers to the adjusted folding position by a second single movement.

25. In the folding mechanism of a high speed rotary printing press in combination a pair of parallel folding rollers and means operable by a single movement for quickly separating said rollers to release a choked fold.

26. In the folding mechanism of a high speed rotary printing press in combination a pair of parallel folding rollers and means operable by a single movement for quickly separating said rollers to release a choked fold, and means being operable by a single return movement to restore the rollers to folding position.

27. In the folding mechanism of a high speed rotary printing press in combination a pair of parallel folding rollers and means operable by a single movement for quickly separating said rollers a definite amount to release a choked fold.

In testimony whereof, I have signed my name to this specification.

WILLIAM EVENSEN.